United States Patent
Kawasaki et al.

(10) Patent No.: US 7,577,873 B2
(45) Date of Patent: Aug. 18, 2009

(54) TRANSMISSION APPARATUS

(75) Inventors: Wataru Kawasaki, Kawasaki (JP); Koshi Kitajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 426 days.

(21) Appl. No.: 11/705,069

(22) Filed: Feb. 12, 2007

(65) Prior Publication Data
US 2008/0016403 A1   Jan. 17, 2008

(30) Foreign Application Priority Data
Jul. 11, 2006   (JP)   ............................. 2006-190143

(51) Int. Cl.
G06F 11/00   (2006.01)

(52) U.S. Cl. ...................................... 714/30
(58) Field of Classification Search .................... 714/4, 714/30
See application file for complete search history.

(56) References Cited

U.S. PATENT DOCUMENTS

| | | | |
|---|---|---|---|
| 5,260,555 A | | 11/1993 | Sakamoto |
| 5,978,937 A | * | 11/1999 | Miyamori et al. ............. 714/45 |
| 6,142,683 A | * | 11/2000 | Madduri ..................... 717/128 |
| 6,647,511 B1 | * | 11/2003 | Swoboda et al. ............. 714/30 |
| 6,769,076 B1 | * | 7/2004 | Moyer et al. .................. 714/30 |
| 7,010,722 B2 | * | 3/2006 | Jahnke ........................ 714/30 |
| 7,013,409 B2 | * | 3/2006 | Gergen et al. ................. 714/34 |
| 7,444,546 B2 | * | 10/2008 | Kimelman et al. ............ 714/31 |

FOREIGN PATENT DOCUMENTS

| | | |
|---|---|---|
| JP | 4-52891 | 2/1992 |
| JP | 2005-327078 | 11/2005 |

* cited by examiner

*Primary Examiner*—Marc Duncan
(74) *Attorney, Agent, or Firm*—Staas & Halsey LLP

(57) ABSTRACT

A transmission apparatus has a main signal processing device, a monitor control part and an intermediating part to intermediate addresses and data between the monitor control part and the main signal processing device. The transmission apparatus further has a first switching part to selectively supply the address or the address and the data output from the intermediating part to the main signal processing device in the normal operation mode, and to selectively supply the address or the address and the data output from the monitor control part to the main signal processing device in the debug mode, and a second selecting part to selectively supply the data output from the intermediating part to the monitor control part in the normal operation mode, and to selectively supply the data output from the main signal processing device to the monitor control part in the debug mode.

10 Claims, 5 Drawing Sheets

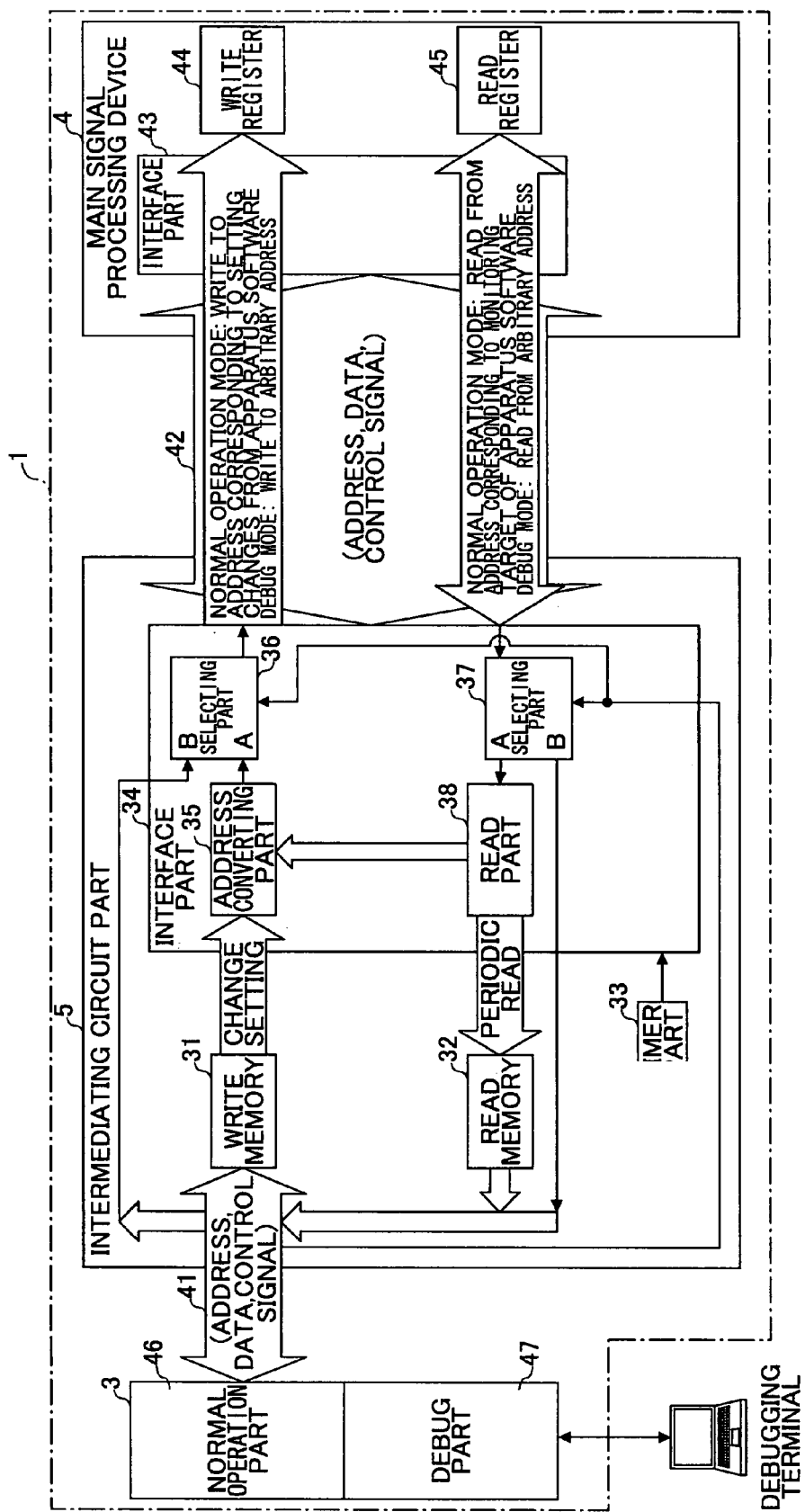

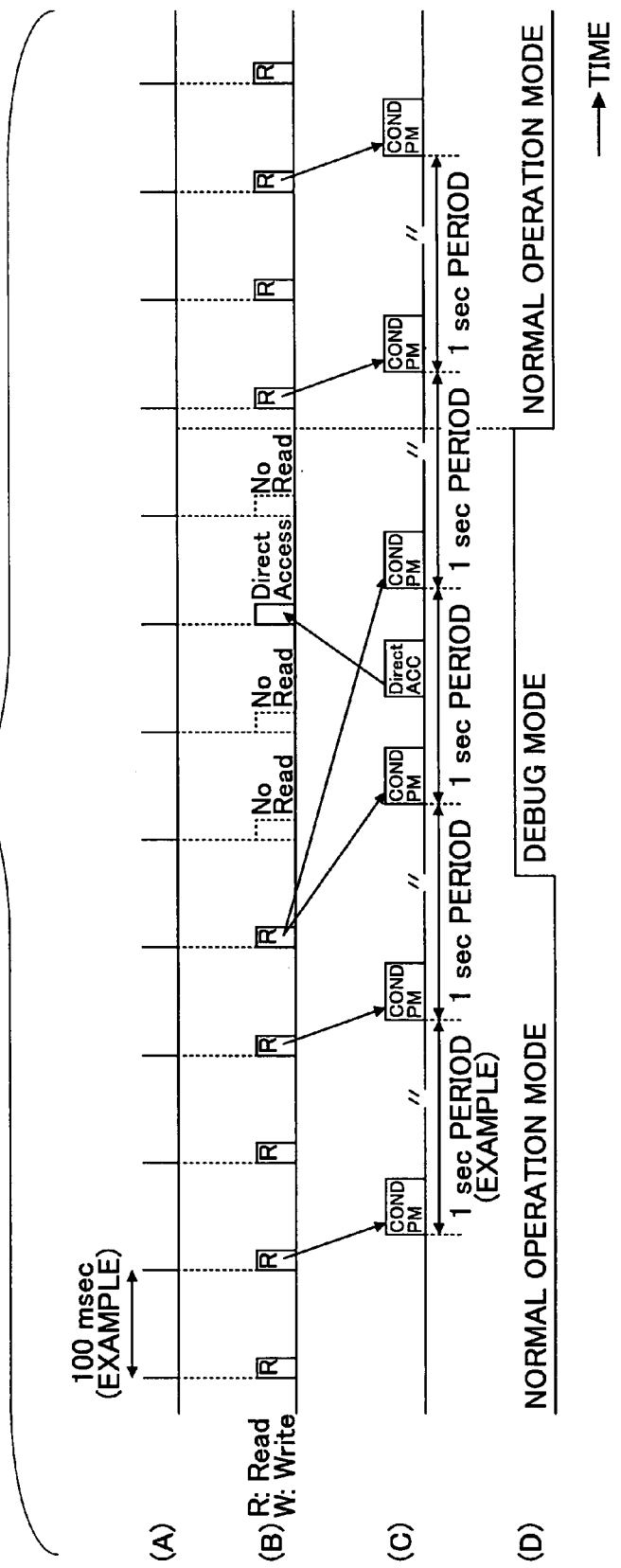

TRANSMISSION APPARATUS

BACKGROUND OF THE INVENTION

1. Field of the Invention

The present invention generally relates to transmission apparatuses, and more particularly to a transmission apparatus having a main signal processing device, a monitor control part and an intermediating part.

2. Description of the Related Art

FIG. 1 is a diagram showing a structure of a general optical transmission apparatus. An optical transmission apparatus 1 shown in FIG. 1 has a main signal processing part 2 and a monitor control part 3. The main signal processing part 2 has a main signal processing device 4 and an intermediating circuit part 5. The monitor control part 3 has a normal operation part 6 and a debug part 7.

The main signal processing device 4 terminals an optical input signal that is input from an optical fiber 8, and monitors the overhead such as the SOH (Section OverHead) and the LOH (Lime OverHead) of the optical signal such as the SONET and the SDH. In addition, the main signal processing device 4 carries out a cross-connect, add, drop or the like with respect to the optical signal depending on the functions available on the optical transmission apparatus 1, and further amplifies the optical signal, so as to output the amplified optical signal to an optical fiber 9.

The intermediating circuit part 5 converts a logical address supplied from the monitor control part 3 into a physical address of the main signal processing device 4, and holds set data supplied from the monitor control part 3 and writes the set data to the main signal processing device 4. The intermediating circuit part 5 also periodically reads and holds state data from the main signal processing device 4, and supplies the state data to the monitor control part 3.

The address conversion is made in the intermediating circuit part 5 because, while the physical address differ depending on the product model number or type of the main signal processing device 4, the functions of the monitor control part 3 are constant regardless of the product model number or type of the main signal processing device 4.

The normal operation part 6 of the monitor control part 3 sets to various parts of the main signal processing device 4 set data supplied from a host unit. In addition, the normal operation part 6 periodically reads and notifies the state of the main signal processing device 4 to the host unit.

A debugging terminal 10 is connected to the debug part 7, so as to debug the programs and the settings of the set data in the various parts of the main signal processing device 4.

FIG. 2 is a system block diagram showing an example of a conventional optical transmission apparatus. In FIG. 2, those parts that are the same as those corresponding parts in FIG. 1 are designated by the same reference numerals, and a description thereof will be omitted. In FIG. 2, the set data and logical address from the monitor control part 3 are irregularly written to and held in a write memory 12 within the intermediating circuit part 5 via an external bus 11.

The set data and write logical address are read from the write memory 12 at a periodic write timing determined by a timer part 13, and supplied to an interface part 14. The write logical address is converted into the physical address of the main signal processing device 4 by an address converting part 15 within the interface part 14. The set data and the physical address are supplied to the main signal processing device 4 via an internal bus 16, and the set data is written in a region of a write register 22 specified by the physical address via an interface part 21 within the main signal processing device 4. For example, the set data may be cross-connect information, band information or the like.

In addition, a read part 17 within the interface part 14 generates a read logical address at a periodic read timing determined by the timer part 13, and supplies the read logical address to the address converting part 15. The read logical address is converted into a physical address of the main signal processing device 4 by the address converting part 15, and is thereafter supplied to the main signal processing device 4 via the internal bus 16. Hence, the state data is read from a region of a read register 23 specified by the physical address. For example, the state data includes monitor information obtained from the overhead such as the SOH (Section OverHead) and the LOH (Lime OverHead), operation state information related to an operating state of the main signal processing device 4, and the like.

The read state data are supplied from the interface part 21 to the read part 17 within the interface part 14, and are written in a read memory 18 by the read part 17. The state data held in the read memory 18 are irregularly read from the monitor control part 3.

FIG. 3 is a timing chart for explaining a state data read operation and a set data write operation of the conventional optical transmission apparatus 1. The timer part 13 generates a timing signal shown in FIG. 3(A) at a constant period of 100 milliseconds, for example. Hence, the read part 17 makes a read access to the read register 23 at timings indicated by "R" in FIG. 3(B). In addition, the set data from the write memory 12 is written by a write access to the write register 22 at timings immediately after the read access, as indicated by "W" in FIG. 3(B).

The normal operation part 6 of the monitor control part 3 reads the state data from the read memory 18 for every 1 second, for example, as shown in FIG. 3(C), asynchronously to the timing signal shown in FIG. 3(A). In addition, the normal operation part 6 writes the set data and the write logical address to the write memory 12 if necessary.

A Japanese Laid-Open Patent Application No. 4-52891 proposes an IC memory card having card interface functions of the direct access system and the indirect access systems.

A Japanese Laid-Open Patent Application No. 2005-327078 proposes making a software access to a register within an LSI for simultaneously setting a plurality of registers, so as to simultaneously set initial values to the plurality of registers within the LSI.

Recently, the circuit scale of the main signal processing device 4 has become large, and the capacities of the write register 22 for setting and the read register 23 for monitor control have also become extremely large. As a result, the circuit scale and the power consumption will increase considerably if all of the monitor control information is to be sent to the monitor control part 3. For this reason, the intermediating circuit part 5 is provided with an address converting function so that the access is only made with respect to the minimum required addresses that are required for the operation of the optical transmission apparatus 1.

However, if an unimaginable problem that is outside the design range occurs at an evaluating stage where the actual main signal processing device 4 of the optical transmission apparatus 1 that is being developed is evaluated, there was a problem in that it is difficult to debug the main signal processing device 4 because the range in which the read access can be made to the read register 23 from the intermediating circuit part 5 is restricted, and there exist within the main signal processing device 4 regions that cannot be read from the intermediating circuit part 5.

SUMMARY OF THE INVENTION

Accordingly, it is a general object of the present invention to provide a novel and useful transmission apparatus in which the problems described above are suppressed.

Another and more specific object of the present invention is to provide a transmission apparatus which can eliminate the restrictions on the regions of the main signal processing device that are accessible, and facilitate the debugging of the main signal processing device.

Still another object of the present invention is to provide a transmission apparatus comprising a main signal processing device configured to carry out a main signal processing; a monitor control part configured to set data to the main signal processing device and monitor and control the main signal processing device by reading the data from the main signal processing device in a normal operation mode, and to debug the main signal processing device in a debug mode; an intermediating part configured to intermediate addresses and data between the monitor control part and the main signal processing device; a first switching part configured to selectively supply the address or the address and the data output from the intermediating part to the main signal processing device in the normal operation mode, and to selectively supply the address or the address and the data output from the monitor control part to the main signal processing device in the debug mode; and a second selecting part configured to selectively supply the data output from the intermediating part to the monitor control part in the normal operation mode, and to selectively supply the data output from the main signal processing device to the monitor control part in the debug mode. According to the transmission apparatus of the present invention, it is possible to eliminate the restrictions on the regions of the main signal processing device that are accessible, and facilitate the debugging of the main signal processing device.

Other objects and further features of the present invention will be apparent from the following detailed description when read in conjunction with the accompanying drawings.

BRIEF DESCRIPTION OF THE DRAWINGS

FIG. 4 is a system block diagram showing an embodiment of a transmission apparatus according to the present invention; and FIG. 5 is a timing chart for explaining a state data read operation and a set data write operation of the embodiment of the transmission apparatus.

DESCRIPTION OF THE PREFERRED EMBODIMENTS

Figure 1:
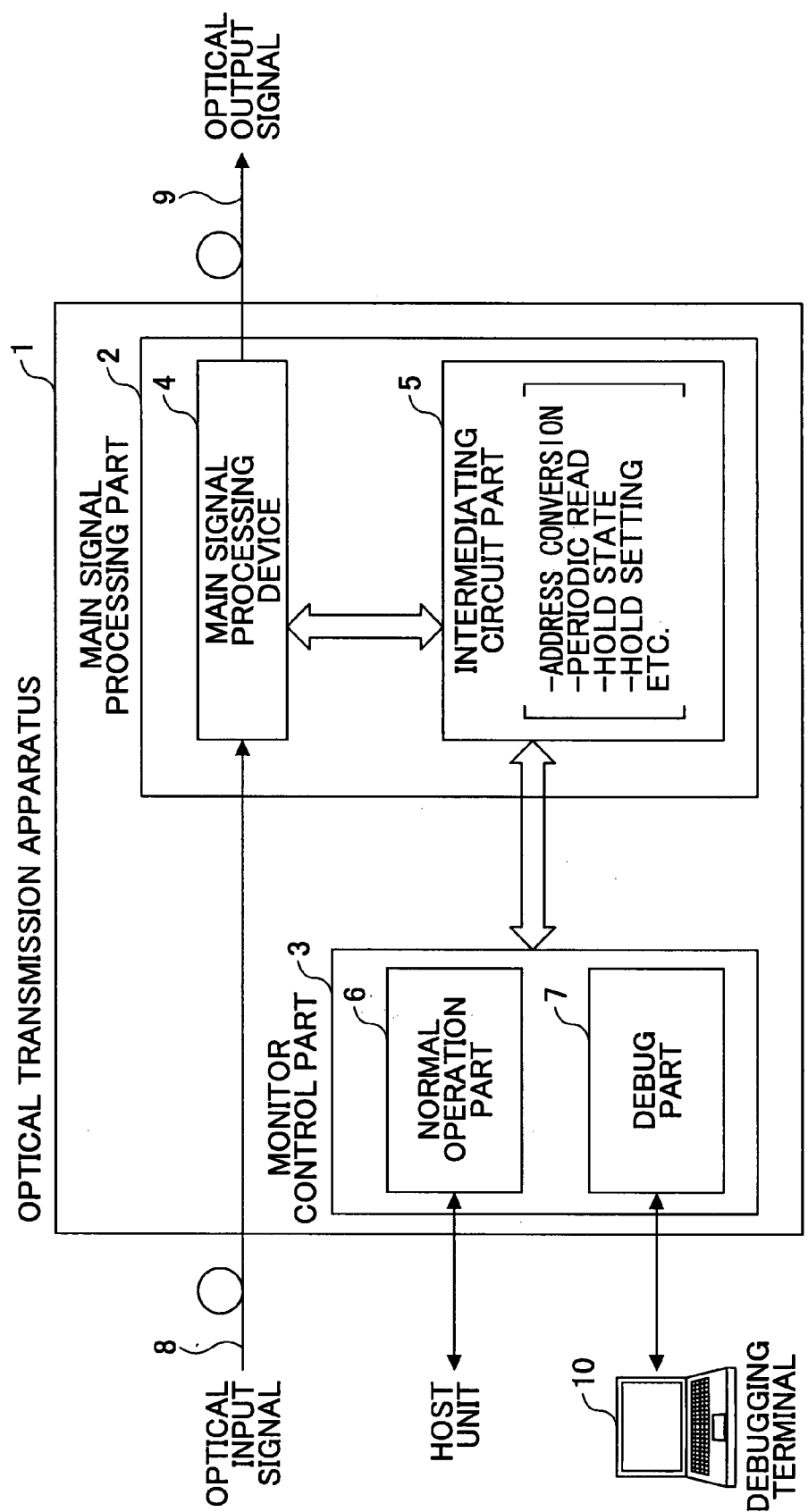
FIG. 1 is a diagram showing a structure of a general optical transmission apparatus.
Figure 2:
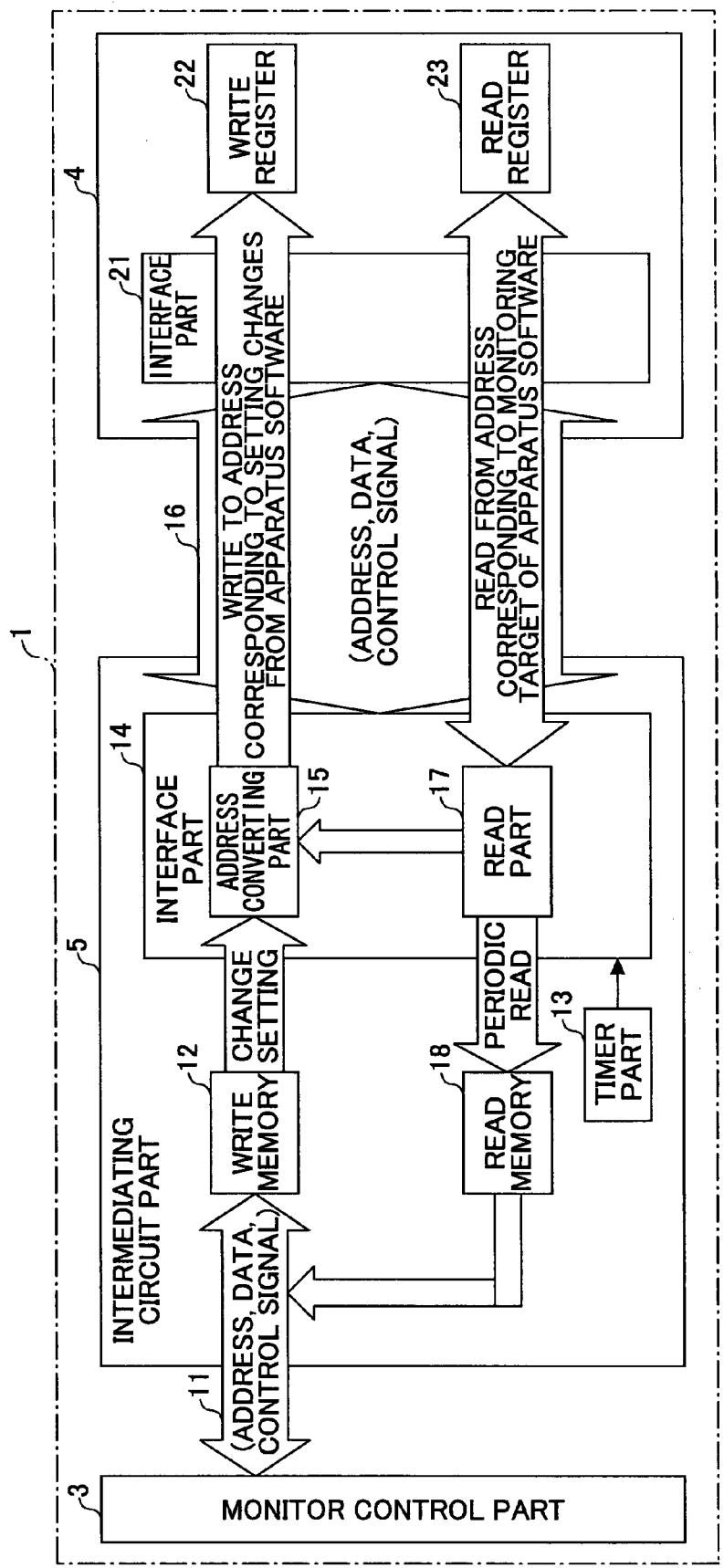
FIG. 2 is a system block diagram showing an example of a conventional optical transmission apparatus.
Figure 3:
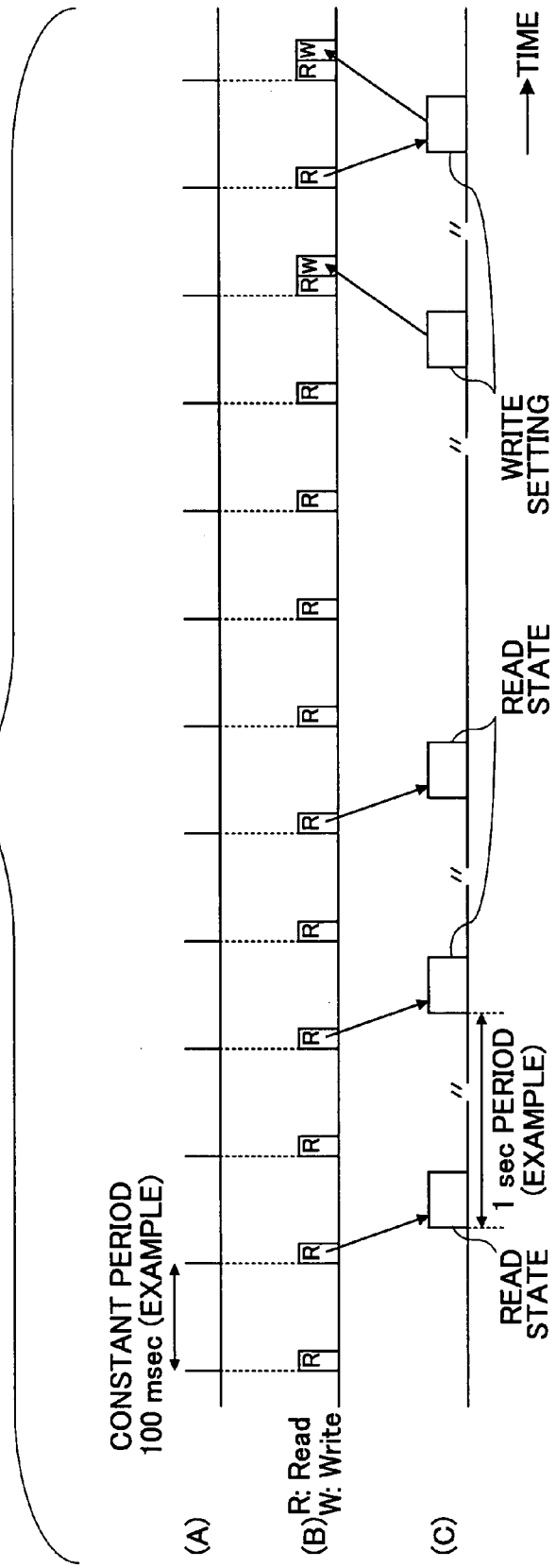
FIG. 3 is a timing chart for explaining a state data read operation and a set data write operation of the conventional optical transmission apparatus.

A description will be given of an embodiment of a transmission apparatus according to the present invention, by referring to FIGS. 4 and 5.

[Structure of the Present Invention]

FIG. 4 is a system block diagram showing this embodiment of the transmission apparatus according to the present invention. An optical transmission apparatus 1 shown in FIG. 4 has a monitor control part 3, a main signal processing device 4 and an intermediating circuit part 5. The intermediating circuit part 5 has a write memory 31, a read memory 32, a timer part 33, and an interface part 34. An address converting part 35, selecting parts 36 and 37, and a read part 38 are provided within the interface part 34.

On the other hand, an interface part 43, a write register 44, and a read register 34 are provided within the main signal processing device 4. The monitor control part 3 has a normal operation part 46 and a debug part 47.

[Normal Operation Mode]

In the normal operation mode, the set data and the logical address are written irregularly from the normal operation part 46 of the monitor control part 3 to the write memory 31 within the intermediating circuit part 5 via an external bus 41.

The set data and the logical address are read from the write memory 31 at a periodic timing determined by the timer part 33, and are supplied to the interface part 34. The address converting part 35 within the interface part 34 converts the logical address into the physical address of the main signal processing device 4, and supplies the set data and the physical address to an input part A of the selecting part 36.

An input part B of the selecting part 36 is connected to a data bus and an address bus of the external bus 41. The selecting part 36 also receives a mode control signal from a control line of the external bus 41. The mode control signal instructs the normal operation mode or the debug mode. The selecting part 36 selectively outputs the data and the address received by the input part A when the mode control signal indicates the normal operation mode, and selectively outputs the data and the address received by the input part B when the mode control signal indicates the debug mode.

In the normal operation mode, the set data and the physical address received via the address converting part 35 are obtained from the selecting part 36, and are supplied to the main signal processing device 4 via an internal bus 42. Hence, the set data is written from the interface part 43 within the main signal processing device 4 to a region of the write register 44 specified by the physical address. For example, the set data includes cross-connect information, band information or the like.

In addition, in the normal operation mode, the read part 38 within the interface part 34 generates a read logical address at a periodic timing determined by the timer part 33, and supplies the read logical address to the address converting part 35. The read logical address is converted into a physical address of the main signal processing device 4 by the address converting part 35, and is thereafter supplied from the selecting part 36 to the main signal processing device 4 via the internal bus 42. Hence, the state data are read from a region of a read register 45 specified by the physical address. For example, the state data includes monitor information obtained from the overhead such as the SOH (Section OverHead) and the LOH (Lime OverHead), operation state information related to an operating state of the main signal processing device 4, and the like. Therefore, the read state data are supplied from the interface part 43 to the selecting part 37 within the interface part 34.

An output part A of the selecting part 37 is connected to the read part 38. On the other hand, an output part B of the selecting part 37 is connected to the data bus of the external bus 41. The selecting part 37 also receives the mode control signal from the control line of the external bus 41. The selecting part 37 selectively outputs the data from the output part A when the mode control signal indicates the normal operation mode, and selectively outputs the data from the output part B when the mode control signal indicates the debug mode.

For this reason, in the normal operation mode, the state data are supplied from the selecting part 37 to the read part 38, and are written to the read memory 32 from the read part 38. The state data held in the read memory 32 are read irregularly from the monitor control part 3.

FIG. 5 is a timing chart for explaining a state data read operation and a set data write operation of this embodiment of the transmission apparatus. The mode control signal shown in FIG. 5(D) indicates the normal operation mode by the low-level period thereof, and indicates the debug mode by the high-level period thereof.

The timer part 33 generates a timing signal shown in FIG. 5(A) at a constant period of 100 milliseconds, for example. In the normal operation mode, the read part 38 makes a read access to the read register 45 at timings indicated by "R" in FIG. 5(B), in response to the timing signal. In addition, the set data from the write memory 31 is written by a write access to the write register 44 at timings immediately after the read access, as indicated by "W" in FIG. 5(B).

In the normal operation mode, the normal operation part 46 of the monitor control part 3 reads the state data from the read memory 32 for every 1 second, for example, as shown in FIG. 5(C), asynchronously to the timing signal shown in FIG. 5(A). In addition, the normal operation part 46 writes the set data and the write logical address to the write memory 31 if necessary.

[Debug Mode]

In the debug mode, the debug part 47 of the monitor control part 3 outputs the read physical address or the write physical address and the debug data. The debug part 47 outputs the physical address and not the logical address, in order to enable access not only to the read register 45 but to all registers within the main signal processing device 4, including the write register 44.

In the debug mode, the read physical address or the write physical address and the debug data output from the debug part 47 of the monitor control part 3 are supplied to the input part B of the selecting part 36, without being supplied via the write memory 31 within the intermediating circuit part 5 or the address converting part 35 within the interface part 34.

The selecting part 36 selects the read physical address or the write physical address and the debug data in response to the mode control signal, and supplies the read physical address or the write physical address and the debug data to the main signal processing device 4 via the internal bus 42. In this state, the access from the address converting part 35 with respect to the write register 44 and the read register 45 depending on the access from the normal operation part 46 is not selected, that is, blocked, by the selecting part 36. For this reason, as indicated by a dotted line in FIG. 5(B), the read access and the write access from the read part 38 with respect to the main signal processing device 4 are stopped. Hence, a direct access is made from the debug part 47 to the main signal processing device 4.

Accordingly, even if the normal operation part 46 of the monitor control part 3 sets the write data with respect to the write register 44, for example, to the write memory 31 for every 1 second as shown in FIG. 5(C) in the debug mode, the write data will not be selected by the selecting part 36. Consequently, the data that is set in the write register 44 from the debug part 47 will not be overwritten by other data in response to a write instruction from the normal operation part 46.

The data depending on the read physical address output from the debug part 47 or, the data depending on the debug data and the write physical address output from the debug part 47, is read as inspection data from the main signal processing device 4 by the direct access from the debug part 47. The inspection data is supplied to the selecting part 37 via the internal bus 42, and is supplied to the debug part 47 of the monitor control part 3 via the output part B of the selecting part 37 and the data bus of the external bus 41. In addition, the debug data is written to the main signal processing device 4 by the direct access from the debug part 47.

Even in the debug mode, the normal operation part 46 of the monitor control part 3 reads the state data from the read memory 18 for every 1 second, for example, as shown in FIG. 5(C). But in the debug mode, the inspection data will not be written to the read memory 32 because the selecting part 37 selectively outputs from the output part B thereof.

In other words, the state data of the normal operation mode at the time immediately before the mode changed to the debug mode remains in the read memory 32, and the normal operation part 46 reads the state data of the normal operation mode at the time immediately before the mode changed to the debug mode from the read memory 32. For this reason, there is no possibility of erroneously reading the inspection data at the time of the debug mode as if it were the state data indicating an error state, for example.

In the debug mode, if a state change (for example, a signal error state) within the main signal processing device 4 caused by the direct access from the debug part 47 to the main signal processing device 4 were detected by the normal operation part 46, the normal operation part 46 would judge that the main signal processing device 4 is in an abnormal state and execute an operation such as disconnecting the communication, which would cause the debug to fail. However, this embodiment can prevent the possibility of the debug to fail due to such an operation of the normal operation part 46.

The selecting part 36 forms a first selecting part, and the selecting part 37 forms a second selecting part. The address converting part 35 forms an address converting means. The write memory 31 forms a write memory means, and the read memory 32 forms a read memory means.

This application claims the benefit of a Japanese Patent Application No. 2006-190143 filed Jul. 11, 2006, in the Japanese Patent Office, the disclosure of which is hereby incorporated by reference.

Further, the present invention is not limited to these embodiments, but various variations and modifications may be made without departing from the scope of the present invention.

What is claimed is:

1. A transmission apparatus comprising:
 a main signal processing device configured to carry out a main signal processing;
 a monitor control part configured to set data to the main signal processing device and monitor and control the main signal processing device by reading the data from the main signal processing device in a normal operation mode, and to debug the main signal processing device in a debug mode;
 an intermediating part configured to intermediate addresses and data between the monitor control part and the main signal processing device;
 a first switching part configured to selectively supply the address or the address and the data output from the intermediating part to the main signal processing device in the normal operation mode, and to selectively supply the address or the address and the data output from the monitor control part to the main signal processing device in the debug mode; and
 a second selecting part configured to selectively supply the data output from the intermediating part to the monitor control part in the normal operation mode, and to selectively supply the data output from the main signal processing device to the monitor control part in the debug mode.

2. The transmission apparatus as claimed in claim 1, wherein the second selecting part blocks the data from the main signal processing device from being supplied to the intermediating part in the debug mode.

3. The transmission apparatus as claimed in claim 2, wherein the monitor control part outputs a logical address of the main signal processing device in the normal operation mode, and outputs a physical address of the main signal processing device in the debug mode.

4. The transmission apparatus as claimed in claim 3, wherein the intermediating part comprises an address converting part configured to convert a logical address supplied from the monitor control part to the physical address of the main signal processing device in the normal operation mode.

5. The transmission apparatus as claimed in claim 4, wherein the intermediating part comprises:
 a write memory configured to hold the logical address and the data supplied from the monitor control part in the normal operation mode; and
 a read memory configured to hold the data supplied from the main signal processing device.

6. The transmission apparatus as claimed in claim 5, wherein the first and second selecting parts are provided within the intermediating part.

7. The transmission apparatus as claimed in claim 1, wherein the monitor control part outputs a logical address of the main signal processing device in the normal operation mode, and outputs a physical address of the main signal processing device in the debug mode.

8. The transmission apparatus as claimed in claim 7, wherein the intermediating part comprises an address converting part configured to convert a logical address supplied from the monitor control part to the physical address of the main signal processing device in the normal operation mode.

9. The transmission apparatus as claimed in claim 8, wherein the intermediating part comprises:
 a write memory configured to hold the logical address and the data supplied from the monitor control part in the normal operation mode; and
 a read memory configured to hold the data supplied from the main signal processing device.

10. The transmission apparatus as claimed in claim 9, wherein the first and second selecting parts are provided within the intermediating part.

* * * * *